United States Patent [19]
Oakley

[11] Patent Number: 5,120,136
[45] Date of Patent: Jun. 9, 1992

[54] OPTICAL TAPE RECORDER HAVING AN ACOUSTO-OPTIC DEVICE FOR SCANNING A RADIANT ENERGY BEAM ONTO A MEDIA

[75] Inventor: William S. Oakley, Sunnyvale, Calif.

[73] Assignee: Lasertape Systems, Inc., Campbell, Calif.

[21] Appl. No.: 405,948

[22] Filed: Sep. 12, 1989

[51] Int. Cl.$^5$ .............................................. G11B 7/00
[52] U.S. Cl. ...................... 369/97; 369/112; 369/44.14; 369/44.18; 369/44.26; 369/44.37; 359/305
[58] Field of Search ...................... 350/358; 369/44.12, 369/44.14, 44.17, 44.18, 44.26, 44.37, 44.38, 97, 100, 109, 112–119; 365/106, 234; 346/108, 762, 135.1; 359/305

[56] References Cited

U.S. PATENT DOCUMENTS

| | | |
|---|---|---|
| 3,632,205 | 1/1972 | Marcy . |
| 3,732,796 | 5/1973 | Marcy . |
| 3,797,935 | 3/1974 | Marcy . |
| 3,874,621 | 4/1975 | Blair et al. . |
| 4,000,493 | 12/1976 | Spaulding et al. . |
| 4,060,323 | 11/1977 | Hirayama et al. . |
| 4,168,506 | 9/1979 | Corsover . |
| 4,201,455 | 5/1980 | Vadasz et al. . |
| 4,321,564 | 3/1982 | Tregay . |
| 4,455,485 | 6/1984 | Hosaka et al. ............... 350/358 X |
| 4,515,879 | 5/1985 | Kuehnle ..................... 365/234 X |
| 4,541,712 | 10/1985 | Whitney . |
| 4,567,585 | 1/1986 | Gelbart . |
| 4,577,932 | 3/1986 | Gelbart . |
| 4,633,455 | 12/1986 | Hudson ....................... 360/97 X |
| 4,669,070 | 5/1987 | Bell . |
| 4,743,091 | 5/1988 | Gelbart . |
| 4,774,579 | 9/1988 | Kucheran et al. . |
| 4,796,038 | 1/1989 | Allen et al. . |
| 4,815,067 | 3/1989 | Webster et al. . |
| 4,872,746 | 10/1989 | Kobayashi .................... 350/358 |
| 4,884,260 | 11/1989 | Bouldin et al. . |
| 4,950,890 | 8/1990 | Gelbart . |
| 4,970,707 | 11/1990 | Hara et al. .................. 369/44.11 |

FOREIGN PATENT DOCUMENTS 2167202 5/1986 United Kingdom ............... 369/97

OTHER PUBLICATIONS

Boushius, G., et al. Principles of Optical Disk Systems, Adam Hilger, Ltd., pp. 130–135.
Oakley, W. S., A 1 GHz Acousto-optic Photorecorder, Procceddings of the Technical Program, Electro-Optical Systems Design Conference, 1976, International Laser Exposition, Sep. 14–16, 1976.
Boushius, G., et al. Principles of Optical Disk Systems, Adam Hilger, Ltd., pp. 130–135.
Oakley, W. S., A 1 GHz Acousto-optic Photorecorder, Procceddings of the Technical Program, Electro-Optical Systems Design Conference, 1976, International Laser Exposition, Sep. 14≠, 1976.
William S. Oakley, Acousto-optical Processing Opens New Vistas In Surveillance and Warning Receivers, Defense Electronics, Oct., 1979.

*Primary Examiner*—Robert L. Richardson
*Attorney, Agent, or Firm*—Blakely, Sokoloff, Taylor & Zafman

[57] ABSTRACT

An apparatus and method for optically recording information on a media. The present invention comprises an optical tape recording system for recording digital information. In the present invention, a Bragg cell, comprising an acousto-optic crystal and a transducer, is used to effect the scanning of a light beam on the media for purposes of recording or reading digital information. Further, position information is recorded on the media to allow accurate tracking of the position of the media under a read/write head of the present invention. In addition, the present invention discloses means for focussing a radiant energy beam on the media comprising a read/write head coupled with a transducer. The read/write head includes a piezoelectric layer which may effect the focussing of the read/write head under the control of a servo mechanism.

7 Claims, 6 Drawing Sheets

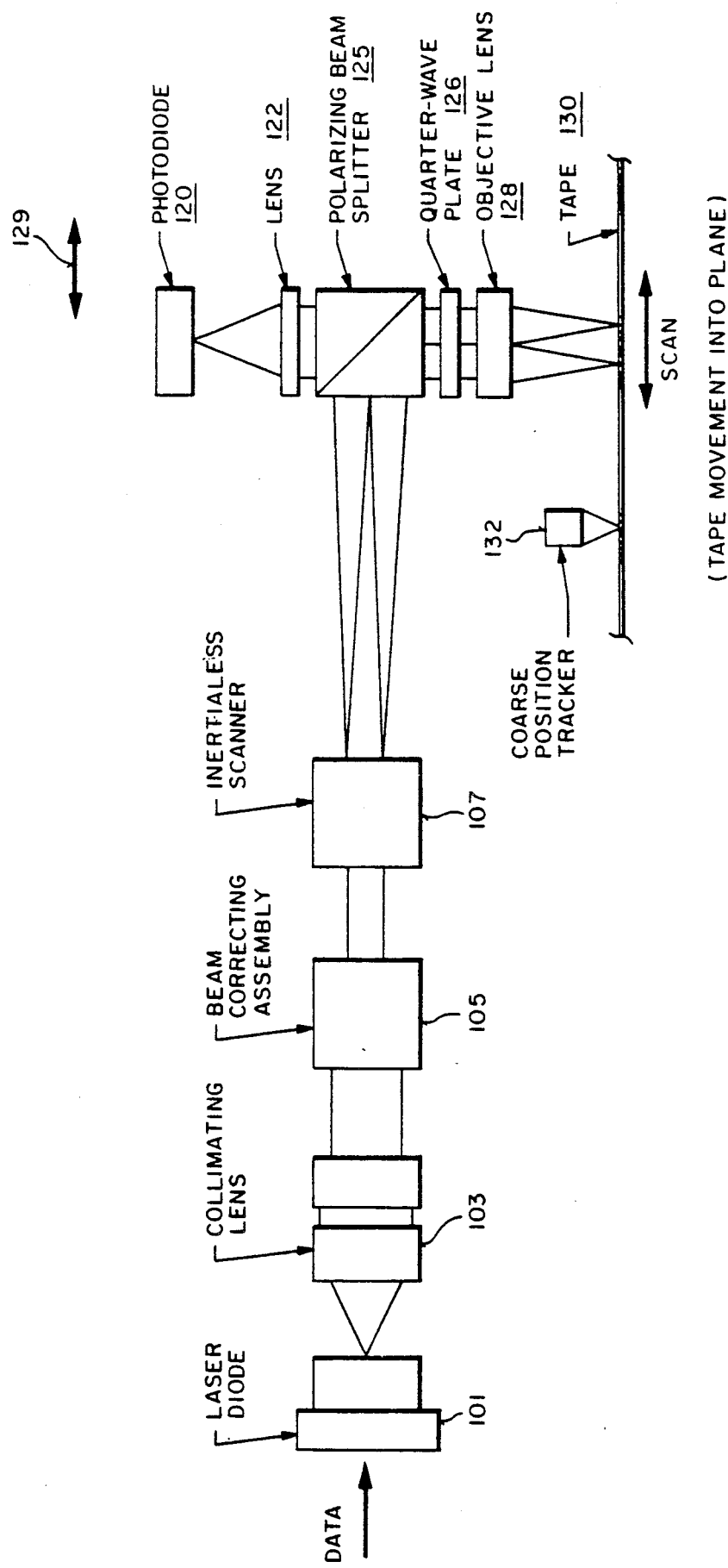
FIG_1

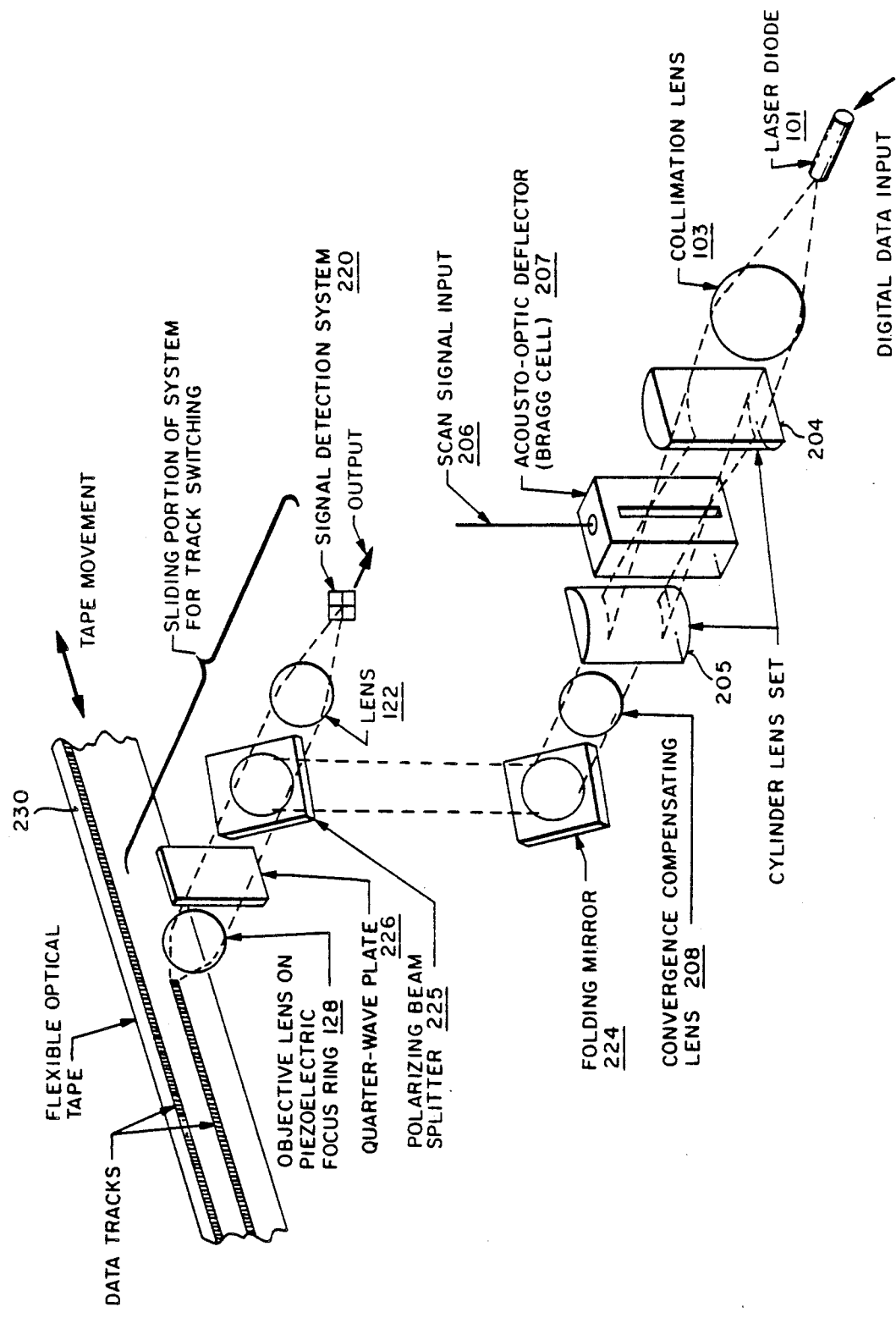

FIG_3A
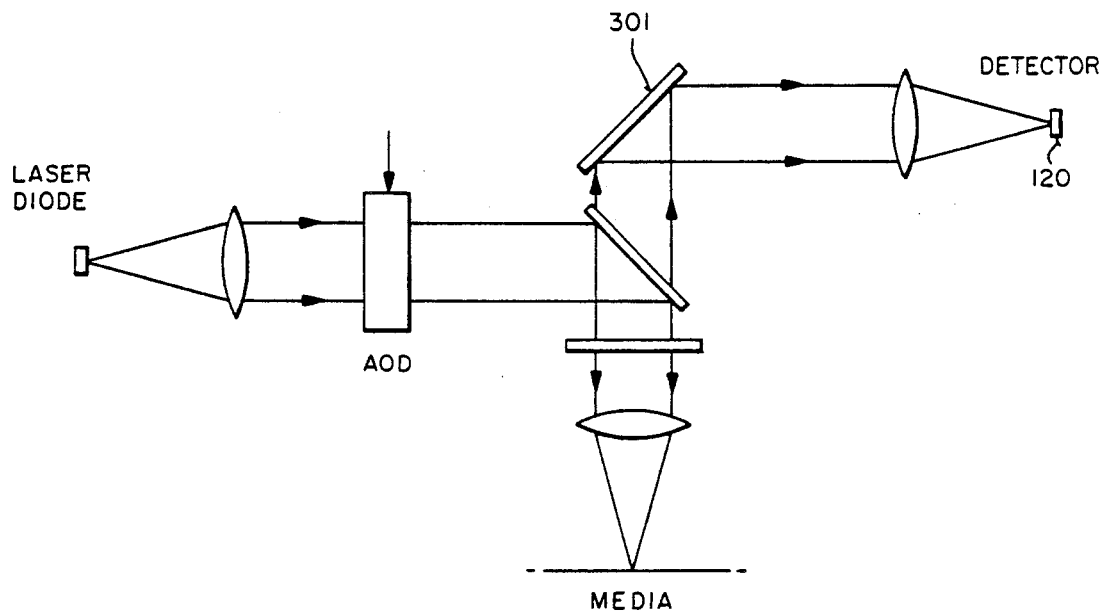
FIG_3B
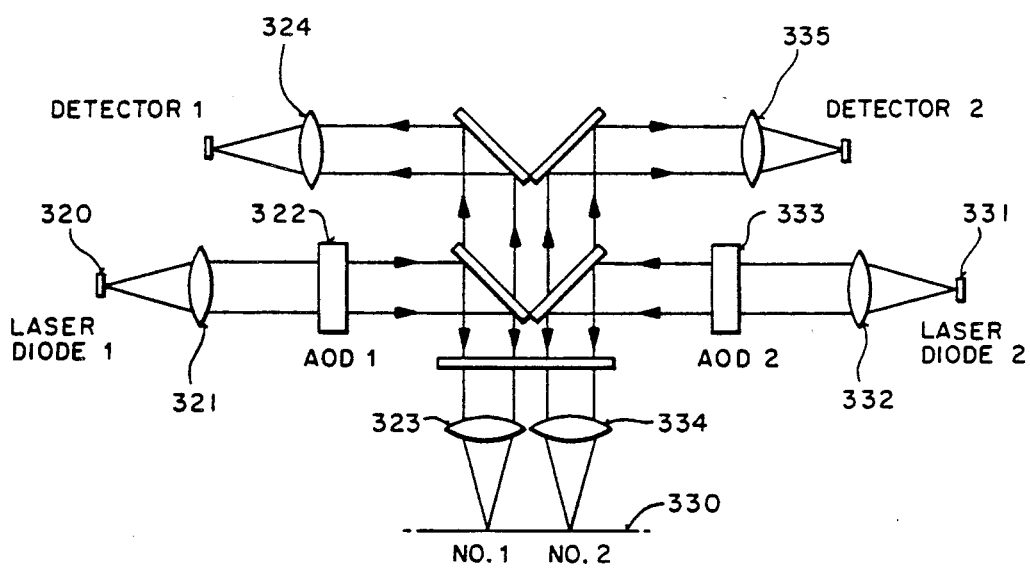

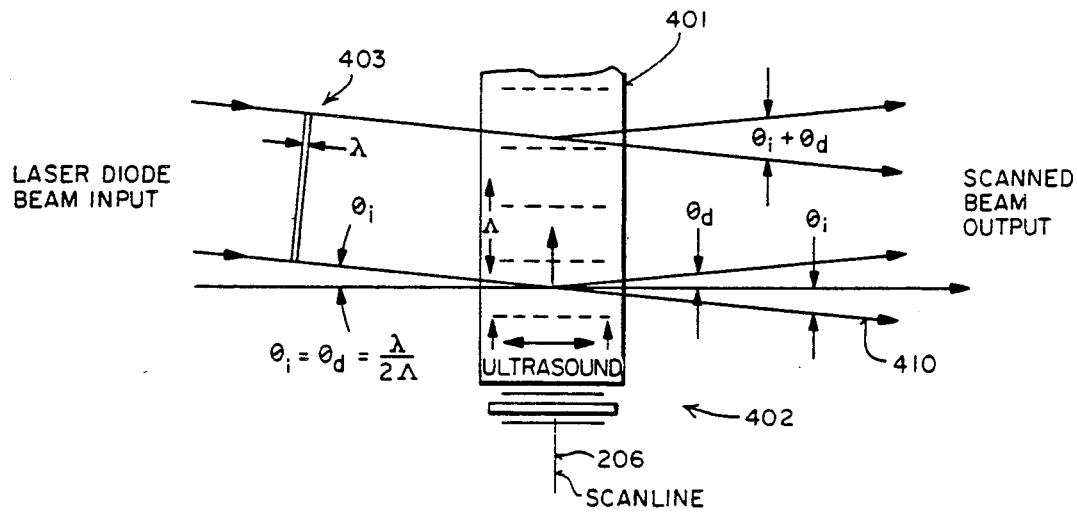
FIG_4
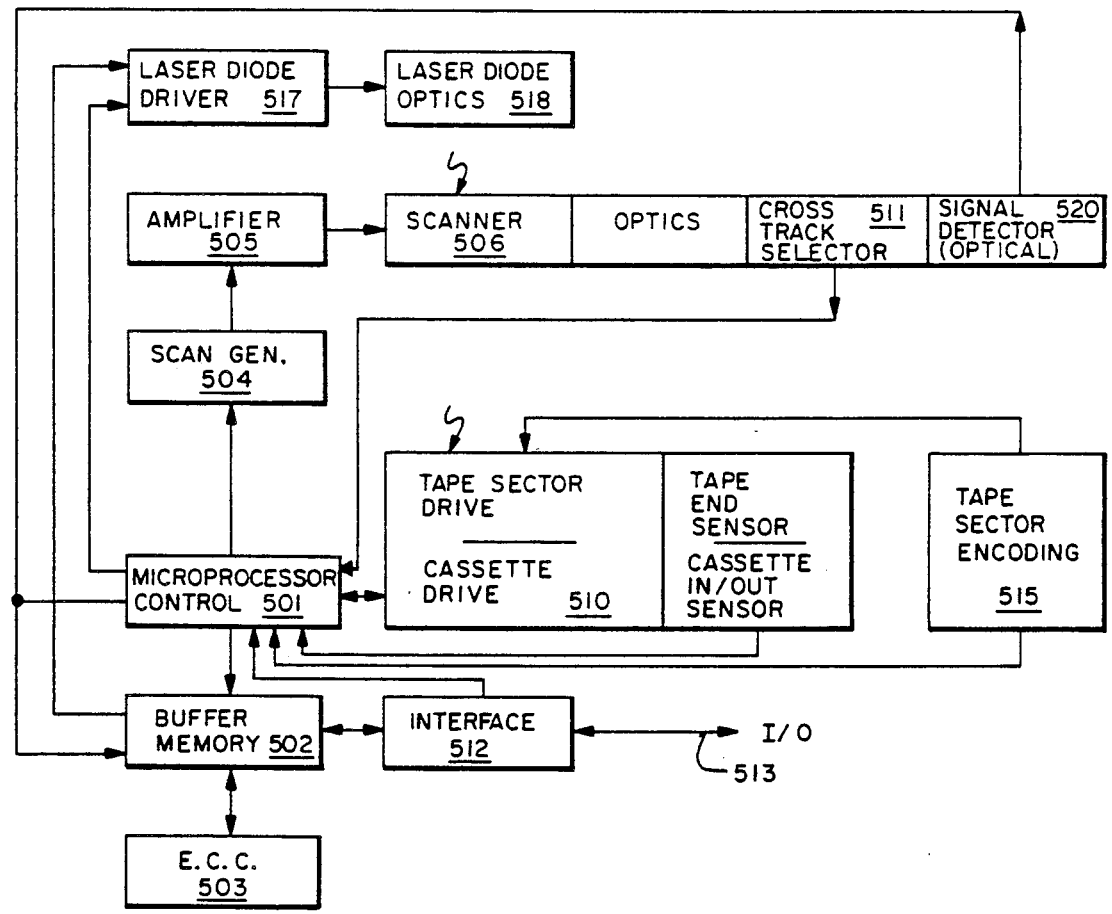
FIG_5

FIG_6
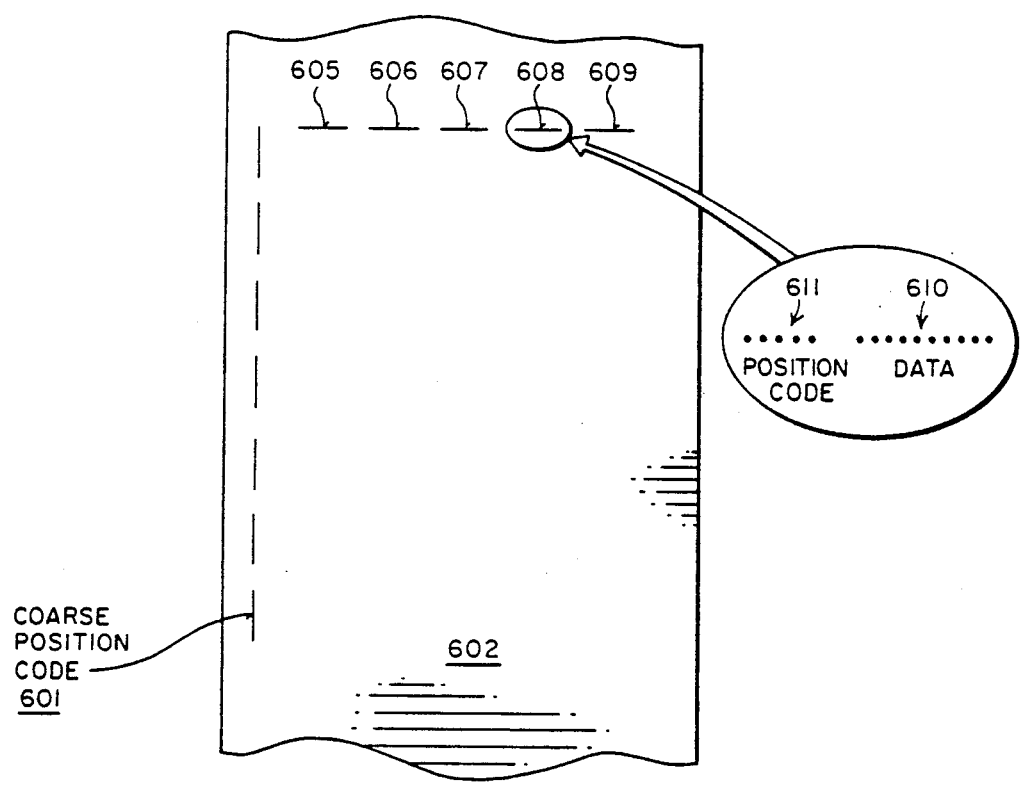
FIG_7
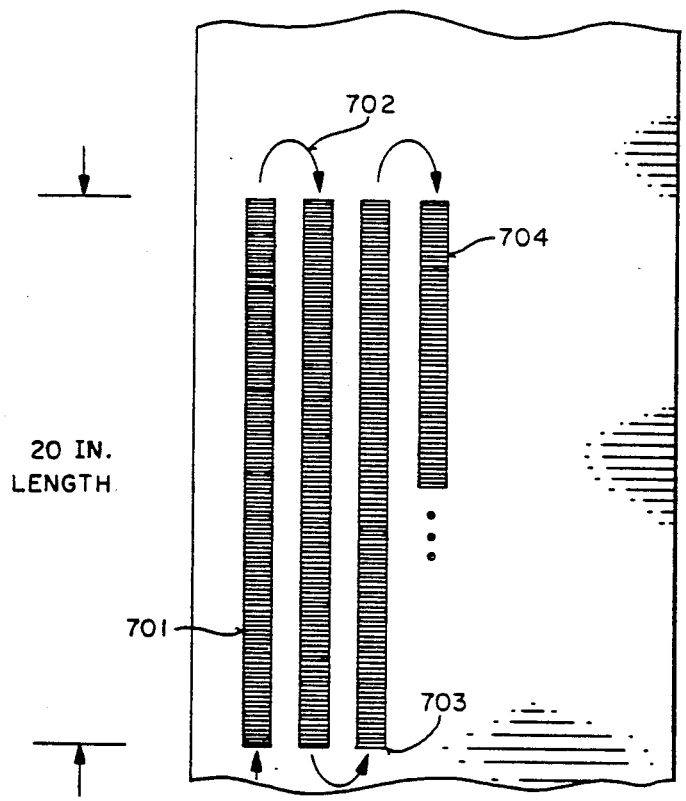

FIG_8
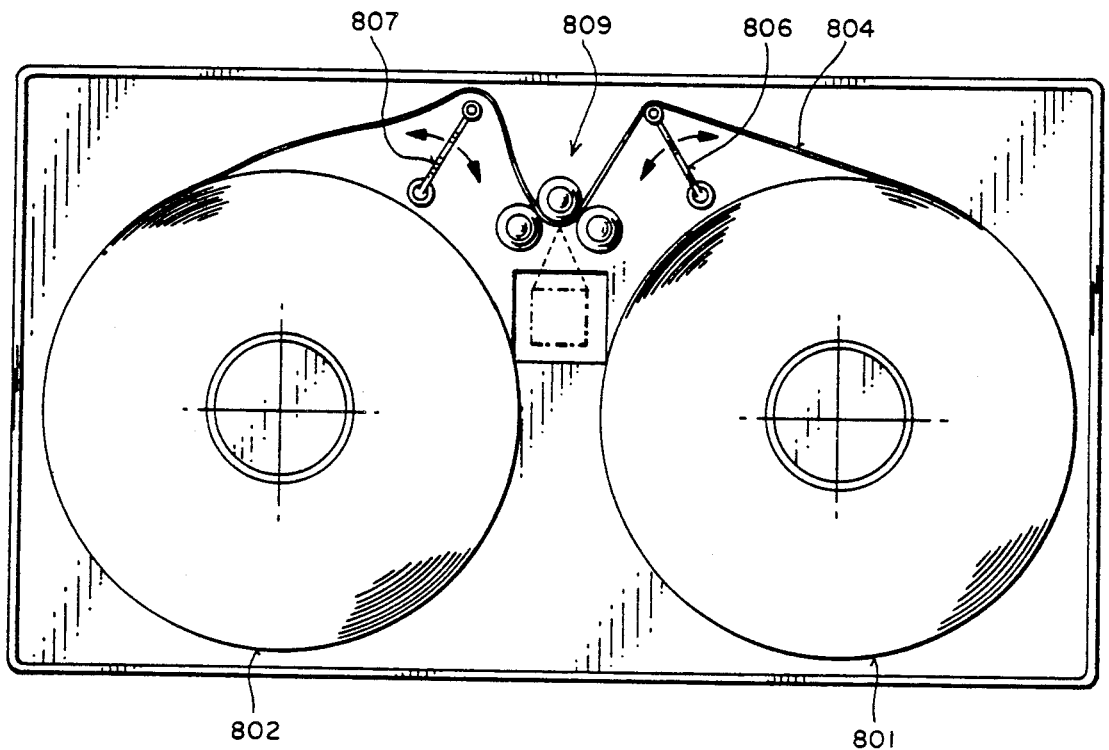
FIG_9
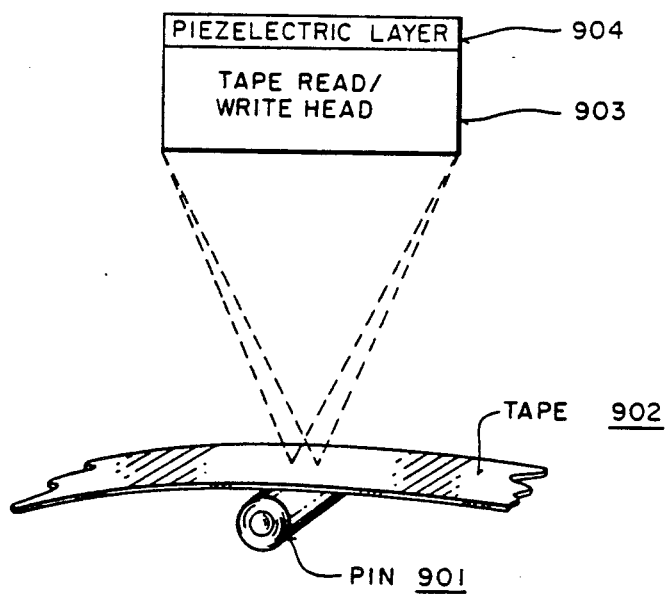

OPTICAL TAPE RECORDER HAVING AN ACOUSTO-OPTIC DEVICE FOR SCANNING A RADIANT ENERGY BEAM ONTO A MEDIA

BACKGROUND OF THE INVENTION

1. Field of the Invention

The present invention relates to the field of mass storage devices for storage and retrieval of information, such as may be utilized, inter alia, by computer systems for archival storage of digital data, for storage and retrieval of document images and for storage of video images or sound recordings; in particular, the present invention relates to the field of optical storage systems, preferably using flexible media such as optical tape.

2. Description of Related Art

Numerous prior art systems are available for the storage and retrieval of information. In each of these systems, certain objectives are clear. It is important to provide for storage and retrieval of information at high speed while maintaining the cost of the storage media and associated hardware at a low cost.

One example of such a storage media is magnetic tape which is typically used for archival storage of information on computer systems and the like. As a particular example magnetic tapes for use with the IBM Model 3480 tape drive are capable of storing 200 megabytes of information. The 3480 tape drive is capable of running the tape from end-to-end in approximately 45 seconds and allows for an average access time of 15 seconds and a standard input/output data rate of 3.0 megabytes per second.

Presently, demand for data storage and retrieval capability is increasing and this increase in demand is expected to escalate in the future. There are numerous reasons for the expected increase in demand for data storage capacity, such as the need to store bit-mapped images of documents, etc. Therefore, it is desired, as one aspect of the present invention to provide a storage and backup system which provides for increased storage capacity, decreased retrieval times and low cost.

One emerging technology useful for the storage and retrieval of information is optical storage systems. Such systems allow for storage and retrieval of information on a medium through use of a light source. A well-known example of an optical storage system is an optical disk. Optical disks are utilized in a variety of functions such as recording of digitally encoded music, permanent storage of data for computer systems, etc.

Flexible optical tape, as opposed to optical disk, has recently entered the market. Optical tape allows for storage of information on optical media with virtually limitless capacity. Non-erasable write once read many (WORM) optical tape is currently available from ICI Imagedata, P.O. Box 6, Shire Park Bessemer Road, Welwyn Garden City, Herts AL7 1HD, ENGLAND. The particular tape manufactured by ICI is available in 35 mm width allowing data to be laser written in a center section at 30 megabytes per square inch (roughly the equivalent in a square inch of medium to 100 standard 5¼ inch double-sided double density floppy disks). Erasable optical tape is expected to be made available in the future. The present invention may work with either erasable or WORM recording media.

Data recording/retrieval systems are known which utilize a light source(s) for reading/writing. For example, U.S. Pat. No. 3,874,621 Blair et al., describes a system in which a continuous wave gas laser is focused at a spot on film. The continuous laser is modulated by a modulator and the light beam is directed to the film through a mirror system.

U.S. Pat. No. 4,168,506 Corsover discloses a film guide for an optical scanner including a modulator and laser source, a first mirror and a second rotating mirror, a lens assembly and a film guide for passage of a recording medium.

More recently, U.S. Pat. No. 4,567,585 Gelbart disclosed an optical tape recording system which utilizes the linear motion of a slide to record data across a slowly moving optical tape. Data is recorded on the tape by modulating the output of a laser in accordance with the data and focussing the modulated light onto the tape.

U.S. Pat. No. 4,577,932 Gelbart describes a laser system in which a single pulse from a light source generates a multi-spot image of a data pattern on a medium through use of an acousto-optic modulator. This reference is typical of prior art systems in which a data signal is used as input to a modulator and a synchronization signal is used as input to a light source.

U.S. Pat. No. 4,743,091 Gelbart describes a system in which a two-dimensional array of discrete laser diodes is utilized to write information on the surface of a light sensitive material.

Finally, U.S. Pat. No. 4,815,067 Webster et al. describes a helically scanned optical tape recording and replay system which utilizes a rotating drum with a galvanometer mirror for controlling the tracking of a number of write and read light beams during recording and replay.

It is desired, among other objects of the present invention, to develop an improved system for reading and/or writing to optical recording media, preferably optical tape.

It is further an object of the present invention to develop a system for reading and/or writing to optical recording media comprising improved means for scanning a radiant energy source onto the media.

It is still further an object of the present invention to develop an optical recording/writing system having improved capability of determining positioning for reading and/or writing to an optical recording media.

It is another object of the present invention to develop an optical recording/writing system having improved capability for focussing of a radiant energy beam on an optical recording media.

These and other objects of the present invention will be appreciated by one of ordinary skill in the art with reference to the below recited Detailed Description of the Preferred Embodiments and the accompanying figures.

SUMMARY OF THE INVENTION

An apparatus and method for recording digital information on a media is described. In the present invention, a radiant energy source, preferably an optical energy source such as a laser diode, produces a radiant energy beam. The radiant energy beam is focussed by a focussing means which, in the preferred embodiment comprises an optical lens assembly. The focussing means produces a focussed energy beam which is directed to a scanning means.

As one inventive aspect of the present invention, the scanning means comprises a Bragg cell which interacts with the focussed energy beam through acousto-optic effects. The Bragg cell preferably comprises an acousto-optic crystal optically coupled for passing the focussed energy beam. The acousto-optic device is coupled with a transducer, preferably a piezoelectric transducer, which converts an input electrical signal into an acoustic signal. The acoustic signal interacts with the energy beam to produce acousto-optic effects.

The present invention further comprises a read/write head assembly optically coupled with an optical recording media. In the present invention, the read/write head assembly comprises a piezoelectric layer which may be excited by a servo mechanism for purposes of focussing the read/write head assembly in reference to the recording media.

In the present invention, the recording media preferably comprises optical tape. The system of the preferred embodiment allows for recording of digital information on the optical tape in blocks, each block recording along a longitudinal length of the tape and comprising a plurality of tracks. Each tracks comprises at least one row of digital information. The read/write head may be moved transversely across the tape to effect writing to each of the tracks. For purposes of determining the longitudinal and transversal position of the read/write head relative to the tape, as well as for focussing of the read/write head relative to the tape, at least one row in each track comprises recorded information indicating the tape position.

Further, for determining a relatively coarse position of the tape, the system of the present invention discloses use of a coarse position tracking means coupled with the read/write head. Optical tape used with the optical recording system of the present invention may be encoded with coarse position information readable by the coarse position tracking means when the tape is passing under the read/write head at a relatively high speed, such as when fast forwarding or rewinding.

The system of the present invention further discloses use of a read/write head assembly comprising a piezoelectric assembly for focussing the read/write head relative to the tape under the control of a servo mechanism. The servo mechanism obtains control information based on the above-described position information recorded on the tape; specifically, the present invention discloses recording a servo track on the tape for purposes of focussing.

In the system of the present invention, two means for advancing and rewinding the optical tape are utilized. The optical tape is preferably disposed on a cartridge including one or two reels. A first means is provided for driving the reels and causing the relatively fast movement of the tape. This is especially useful during periods of rewinding or fast forwarding. During periods of writing to and/or reading of the tape, tape movement is desirably considerably slower. The present discloses a second means for advancing and rewinding the tape relative to the read/write head comprising a tensioning means, preferably two tape tensioning arms. The optical tape is positioned relative to the read/write head by the relative movement of the two tensioning arms.

BRIEF DESCRIPTION OF THE DRAWINGS

FIG. 1 is a block diagram of a first embodiment of an optical system as may be utilized by the present invention.

FIG. 2 is a second block diagram of the first embodiment showing additional detail of the present invention.

FIG. 3(a) is a block diagram of a second embodiment of an optical system as may be utilized by the present invention.

FIG. 3(b) is a block diagram of a third embodiment of an optical system as may be utilized by the present invention.

FIG. 4 is an illustration of an acousto-optic deflector which may be utilized by the present invention.

FIG. 5 is a overall schematic diagram illustrating the relationship of components in an embodiment of the present invention.

FIG. 6 is an illustration of a tape format which may be utilized by the present invention.

FIG. 7 is an illustration of a tape format showing a blocking method as may be utilized by the present invention.

FIG. 8 is an illustration of a tape drive mechanism as may be utilized by the present invention.

FIG. 9 is an illustration of a portion of a read-write head and tape drive mechanism of an embodiment of the present invention.

DESCRIPTION OF THE PREFERRED EMBODIMENT

A recording/reading apparatus is described. In the following description, numerous specific details are set forth such as specific circuits, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF THE PRESENT INVENTION

The present invention describes a system for achieving storage and retrieval of large volumes of information at read/write rates and data seek times heretofore not possible. In the preferred embodiments of the present invention, information is stored on an optical recording medium, preferably optical tape. It is understood that, in certain embodiments of the invention, alternative recording medium may be utilized, for example, optical disks. Use of an optical recording medium allows for improved read/write rates and data seek times over other media, such as magnetic recording media. Use of tape allows for expanded storage capability over use of disks and the like.

Optical tape, as may be utilized by the present invention, is available commercially from ICI Imagedata, P.O. Box 6, Shire Park Bessemer Road, Welwyn Garden City, Herts AL7 1HD, ENGLAND and is expected to be available from alternative vendors in various sizes and formats in the near future.

Optical recording media is generally available in either a transparent tape in which data is written as regions of varied transmittance or a reflective tape in which data is written as regions of varied reflectance. Although the described embodiments of the present invention are directed to use of the latter media, it will be obvious to one of ordinary skill in the art that alternative embodiments may be utilized which employ the former media.

In addition, currently available optical tape technology allows data to be written once and read many times (often referred to as WORM, write once, read many times, technology). Although the described embodiments are designed for implementation with WORM recording media, it will be obvious that alternative embodiments may be constructed using media which may be re-written. For example, one proposed technology for optical recording media allows information recorded on the media to be erased by exposing the media to heat. The media may then be re-written. The present invention may be easily adapted to employ such media though placement of a controllable heat source in the tape path prior to the recording head. Alternatively, a second optical source may be employed permitting erasure of a bit or array of bits. The second optical source may be configured similar to the optical source described below which is utilized by the preferred embodiment for writing to the tape.

Systems embodying the present invention may find use in a large number of current and future applications. For example, the technology of the present invention may be utilized for data back-up for computer systems, document image storage and recording of visual media such as television signals.

DESCRIPTION OF A FIRST EMBODIMENT OF THE PRESENT INVENTION

Overview

The present invention is preferably embodied in an optical tape recording/reading apparatus. The optical tape system of the present invention allows recording and retrieval of digital data using solid-state optical beam deflection techniques. As illustrated with reference to FIG. 1, the system of the preferred embodiment comprises a radiant energy source 101 positioned to project a radiant energy beam through a collimating lens 103, a beam correcting assembly 105 into a scanner means 107. A beam is projected from the scanner means 107 to a polarizing beam splitter/mirror assembly 125, then through a lens assembly comprising a quarter-wave plate 126 and an objective lens 128 onto a recording medium such as tape 130.

As will be explained in greater detail with reference to FIG. 5, as one feature of the present, a coarse position tracker means 132 is provided for allowing determination of the approximate position at which the tape is currently positioned in the recording/read mechanism. This feature is particularly useful when rapidly advancing or rewinding a tape in the system of the present invention, such as when searching for a particular location on the tape from which to read.

As will be apparent to one of ordinary skill in the art, an optically sensitive recording medium may be written onto using the above-described components of the present invention. These components will be described in more detail below to better enable the skilled artisan to practice the invention. Additionally, the described embodiment of the present invention comprises components necessary to allow reading of data from the optically sensitive recording medium including lens 122 and photodiode 120.

Laser Diode 101

The laser 101 preferably comprises a solid state diode laser operating near 830 nm. It is, of course, obvious that alternative radiant energy sources may be utilized. What is important is that the radiant energy source produce sufficient energy to allow exposure of the recording medium and that the energy source may be controlled to allow presentation of digital information for recording on the recording medium.

Collimating Lens 103

The energy beam produced by the laser 101 is preferably collimated by a collimating lens assembly 103 to form a beam matching the input requirements of the beam matching assembly 105.

Beam Matching Assembly 105

The beam matching assembly 105 is provided to allow for correction of the collimated input beam to the scanner. Further, referring to FIG. 2, beam matching means are provided to nominally collimate the output of the scanning means 107. Preferably, a first cylindrical lens 204 is provided for beam matching positioned in the beam path between the collimating lens 103 and the scanning means 107. The first cylindrical lens 204 provides for focussing of the beam onto the scanning means 107 (shown, in its preferred embodiment as an acousto-optic deflector 207 in FIG. 2). The parameters of the beam matching optics are selected to match the size of the optical beam with the size of the acoustic beam passing through scanner 107.

In addition, a second cylindrical lens 205 is provided, positioned in the beam path between the scanning means 107 and beam splitter/mirror assembly 125. Preferably, as illustrated by FIG. 2, a convergence compensating lens 208 is also provided in the path of the beam between the second cylindrical lens 205 and the beam splitter mirror assembly 125.

Scanning Means 107

As illustrated by FIG. 2, in the preferred embodiment, the scanning means comprises an acousto-optic deflector (AOD) 207. The AOD 207 is positioned to receive the energy beam from the cylindrical lens 204 and product an output beam directed to cylindrical lens 205. The AOD is further coupled to receive a scan input signal on line 206.

The AOD is shown in more detail with reference to FIG. 4. In the preferred implementation, a tellerium dioxide crystal 401 is utilized in which propagates a shear mode acoustic wave. Although the preferred implementation utilizes an AOD comprising the tellerium dioxide crystal 401, any device having similar characteristics may be utilized.

A class of such devices, commonly referred to as Bragg cells, may be generally defined as devices in which a signal interacts with a light beam by means of acousto-optic effects.

The signal is converted to acoustic energy by means of a piezoelectric transducer 402 which is bonded to the crystal 401 and tuned to a frequency band of interest. The transducer 402 of the preferred embodiment comprises a lithium niobate wafer; however other materials may be substituted without departure from the scope and spirit of the present invention. For example, zinc oxide may be deposited on crystal 401 to form the transducer 402.

Bragg cells may comprise glass, crystal or even a liquid as the crystal 401; however, it has been discovered that natural crystals in general and tellerium dioxide in particular yield efficiencies over other types of cells when used in the present invention. The ultrasonic waves generated by the transducer 402 travel through the cell and interact with the light beam 403 entering the cell from the laser diode 101.

It has been found that for implementation of the present invention, that slow shear mode waves produce the most desirous results in terms of frequency resolution. Longitudinal and surface waves may also be considered; however results are not expected to be comparable to use of shear mode waves.

The tellerium crystal of the preferred embodiment utilizes two (2) watts of power at eighty-percent (80%) efficiency and reacts over a frequency range from 82 to 157 MHz.

In general, use of shear mode tellerium dioxide crystals limits the operable bandwidths of the scan signal to around 75 MHz. In the case of systems in which is desirable to operate at higher read/write rates, other AOD crystals and modes may be utilized. As discussed above, use of other crystals and/or modes may lead to loss of efficiency requiring use of higher powered energy sources for producing the necessary energy beam to be deflected. As examples, shear mode lithium niobate AODs may be utilized offering bandwidths of over 1 GHz. Use of such a crystal would operate at a substantially faster read/write rate (on the order of 20 times faster than with use of the preferred tellerium dioxide crystal); however, such a system would require even greater laser power (on the order of 100 times greater).

The scan input signal on line 206 is a saw-toothed radio frequency (RF) signal nominally between 80 and 160 MHz. A frequency varying signal such as a linear frequency sweep ("chirp") signal is utilized to yield a different deflection angle for the light beam 403 across the AOD aperture. This results in a "lensing" effect on the beam equivalent to use of an additional positive or negative cylinder lens which moves with the sound beam and is compensated for by lens 208.

In general, the focal length of the "lens" created by the linear frequency sweep signal is given by the formula:

$$F = \frac{V^2}{\lambda} \left( \frac{df}{dt} \right)^{-1}$$

where:
F is the length of the "lens";
df/dt is the input signal chirp rate;
V is the acoustic velocity of the AOD; and
λ is the wavelength of the optical beam.

Use of the AOD for Writing onto the Recording Medium

Use of AODs in optical systems is well-known for purposes of modulating an energy beam. However, an inventive advantage of the present invention is the use of the AOD for purposes of scanning (writing) on the recording medium.

As can be seen with reference to FIG. 4, the light beam 403 enters the AOD 401 from one side. A projection of the light beam 403 though the AOD 401 is shown, without effect of the scan signal, as beam 410. The scan signal on scan line 206 may be utilized to effectively deflect the output beam at a determinable angle from its angle of entry into the AOD, the angle being variable depending on the frequency of the scan signal. The beam is directed through a converging lens 208, mirror 224, beam splitter 225, quarter wave plate 226 and objective lens 128 for purposes of obtaining a focussed spot of light on the recording medium 230.

By linearly varying the input frequency of the scan signal the focussed point of light may be directed at one of a plurality of spots on the recording medium.

The total scan length is preferably approximately 0.9 mm and the spot size of each individual pixel is approximately 1 microns in diameter allowing for recording of over 600 individual spots in each scan line. Scanning is accomplished by varying the input scan signal chirp rate which effectively varies the focal spot of the output energy beam from the AOM.

WRITE FORMAT OF THE PREFERRED EMBODIMENT

Error Detection and Correction

Although the preferred embodiment allows for writing of over 600 bits or spots of information per scan, preferably, error detection and correction information is included in each scan line. Therefore, the preferred implementation of the present invention writes 512 bits of data information per scan line with the remaining bits comprising error detection and correction codes, as well as position information and control information for controlling a servo mechanism for purposes of focusing of the read/write head of the system of the present invention relative to the tape surface. Any of a number of known error detection and correction schemes may be employed by the present invention. The positioning and control information will be described in more detail below.

The present invention further provides writing of data in blocks, each block comprising a plurality of scan lines. Each data block is followed by error correcting code relating to the block. The size of the data block is dependent on factors such as the width of the recording area and other factors determined in any particular embodiment to increase efficiency in reading and writing the data. The error correcting code may require up to approximately 25% of the space required for writing data depending on the bit error rate which is to be achieved by a particular implementation of the present invention and the raw bit error rate of the optical storage media.

As one alternative to the preferred embodiment, a separate read mechanism may be placed in the optical tape recording system just after the read/write mechanism of FIG. 1, allowing for data which has been written to be immediately read and checked for bit errors. If an excessive number of bit errors is encountered in any given data block, the data block may be marked as invalid and the block rewritten at a later point on the tape (especially in implementation using WORM tape) or the tape may be rewound and the block rewritten (in implementations using erasable tape).

Read/Write Tracks and Head Positioning

The preferred implementation further allows for recording on a plurality of tracks across the recording medium through movement of the read/write head assembly. In this way, the same unit may be utilized with multiple tape widths, such as 8 mm, ½ inch, 19 mm or 35 mm tapes. As can be seen with reference to FIG. 1 and particularly as indicated by arrow 129, the read/write head of the preferred embodiment (comprising photodiode 120, lens 122, beam splitter 125, quarter-wave plate 126 and objective lens 128) may be moved across the width of the tape. (FIG. 1 illustrates the tape 130 showing tape movement into and out of the plane of the paper). After writing a first track, the read/write head may be moved and the adjacent track written.

Data Blocking/Tape Movement

The format for writing tracks onto the tape in the preferred embodiment is shown in further detail with reference to FIG. 7. A first track 701 is written over some predetermined length of tape, preferably approximately twenty (20) inches, in a first direction, after which the tape write direction is reversed, the read/write head is positioned over the write area for a second track 702 and the second track 702 is written over the predetermined length of tape. After writing the second track 702, the tape write direction is again reversed, the head repositioned, and track 703 is written. This process of writing a track, positioning the read/write head, reversing direction of the tape and writing the next track continues, such as for track 704, for each track across the width of the tape. The number of tracks on the tape is dependent on the width of the tape.

The present invention further discloses a mechanism for allowing positioning of the tape for reading and writing. In systems employing optical recording media, due to the density of data on the media, tape movement speed during reading and writing is relatively slow. However, it is desirable to develop a system which allows for rapid tape movement during rewinding and forwarding of tape, such as when seeking a new location on the tape for reading/writing. In general, use of tape drives which allow for multiple speeds adds complexity and expense to systems.

Therefore, the present invention discloses a tape drive mechanism as illustrated by FIG. 8 comprising a first reel 801 and a second reel 802 for holding optical tape 804 and read/write precision drive mechanism 809. In the preferred embodiment, the tape is housed in a cartridge and wound around reels 801 and 802. The entire cartridge may then be inserted into a tape drive for reading and writing to the tape.

The reels 801 and 802 are removably coupled with coarse drive mechanisms for allowing movement of the reels 801 and 802 in either a forward or reverse direction. The coarse drive mechanisms operate to drive the tape at a relatively high speed (higher than the rate at which the read/write mechanism is able to access information recorded on the tape). Driving the reels with the coarse drive mechanisms allows for fast forwarding and rewinding of the tape allowing for coarse positioning of the tape prior to reading or writing data. In the preferred embodiment, the coarse drive mechanisms comprise motor and gear assemblies as may be developed by one of ordinary skill in the art.

The tape drive mechanism further comprises tape tensioning arms 806 and 807. After the tape is positioned roughly at the correct position as determined by sensing the tape position with coarse position tracker 132, slack is left in the tape between reel 801 and reel 802. Precision drive mechanism 809 provides for movement of the slack portion of the tape relative to the read/write head during periods of reading and writing to the tape. The precision drive mechanism 809 provides for movement of the tape at a slower rate of speed than the coarse drive mechanism. In the preferred embodiment, approximately eight (8) inches of slack are left in the tape allowing for an approximately equivalent amount of movement relative to the read/write head by the precision drive means 809 without need to engage the coarse drive mechanism.

Arms 806 and 807 are provided for tensioning of the slack tape. For example, if it is desired to move the tape 804 in the direction of reel 801, tape tensioning arm 806 is raised to cause tensioning of the tape in the direction of reel 801. Conversely, if it is desired to move the tape 804 in the direction of reel 802, tape tensioning arm 807 is raised. Of course, tape tensioning arms 806 and 807 may be coupled or controlled to allow tensioning of the in either direction without stretching or damaging the tape by causing tensioning arm 807 to release tension on the tape proportional to increases in tension placed on the tape by tensioning arm 806, and visa versa.

Tape Position Indication

The preferred embodiment of the present invention utilizes two separate and independent means for determining the position of the tape under the read/write head of the recording system. A first means is used to position the tape for within relatively large boundaries (i.e., at x number of inches or feet from the beginning of the tape). The second means is used for more accurate positioning of the tape when actually reading and/or writing information. Each of these positioning mechanisms will be described in greater detail below.

Coarse Position Indicator

As illustrated in FIG. 1, the preferred embodiment of the present invention comprises a means, labelled as coarse position tracker 132, for determining the portion of the tape 130 currently under the read/write head of the recording system. The coarse position tracker 132 is used to determine the position within relatively large longitudinal boundaries, i.e., a "coarse" position.

With reference to FIG. 6, as part of the format of the optical tape of the present invention, coarse position codes 601 are provided on tape 602 to indicate position along the tape. The coarse position codes 601 may be read by coarse position tracker 132 for purposes of determining tape location. The coarse position codes 601 may comprise, for example, bar codes or other coded information which is readable by a scanning means, such as coarse position tracker 132, when the tape 602 is passing at a relatively high rate of speed.

In general, the present invention makes use of the coarse position information during periods of rewinding and fast forwarding of the tape (in the preferred embodiment, this period is the period of time when tape movement is being controlled by the coarse drive mechanisms).

Fine Position Codes

In writing digital date to the tape, a data format as illustrated by FIG. 6 is employed. Data bits 610 in each track, such as tracks 605 through 609, are preceded by a plurality of position bits 611. The position bits are used to determine an exact position (transverse and longitudinal) along tape 602. In addition, position bits 611 are used for focussing of the system through control of a servo mechanism used for focussing the read/write head of the system of the present invention relative to the tape as will be discussed in more detail below.

In the presently preferred embodiment, the position bits 611 comprise three sets of information codes: (1) a servo track used for focussing of the read/write head, (2) four bits used for indicating which of sixteen tracks are represented by the position bits and (3) a plurality of additional bits used for defining position within the track. In the preferred embodiment, the plurality of additional bits comprises 6 bits allowing positioning to within one- sixty fourth (1/64) of the length of the track ($2^6=64$). Thus, for example in a system having a track length of 20 inches, position can be defined to within approximately one- third of one inch (20 inches/64).

The transverse position of the scan beam from the read/write head is determined by evaluating a stream of pulses received from scanning the position code and referencing the pulse stream to the scan signal timing on scan signal input line 206.

The longitudinal position of the tape is determined by examining the signals received from scanning the position code. As a side note, one characteristic of acousto-optic devices is the ability to superpose signals in an analog manner producing multiple beams. In the present invention, utilizing this feature a separate signal system produces a steady tracking beam in the position of selected position code bits. Due to the lack of a chirp, this second signal is diffused slightly in the scan direction and may be further spread by a slight frequency modulation of the input signal. The line source created by this beam may be used to determine longitudinal position of the previously written position code by monitoring its amplitude.

The position information gained using this system may be further improved by the use of a dual detection system aligned to allow the position code image to move progressively from one detector to another. Such a system is illustrated with reference to FIG. 3(b) which shows a first laser diode 320, a first collimating lens 321, a first acousto-optic diode 322, first read/write head assembly 323 and first detector means 324 arranged to cooperate with corresponding second laser diode 331, second collimating lens 322, second acousto-optic diode 323, second read/write head assembly 324 and second detector means 335. As in the previously described system, the detector means 324 and 335 are preferred photodiodes for receiving light energy.

Use of two separate tracking beams, as described above, one at each end of the scan line, allows for dynamic determination of the skew of the data to be read with respect to the scan line produced by the acousto-optic diode.

Focussing

With reference to FIG. 9, a system for bringing the optical tape into focus with reference to the tape read/write head 903 is shown.

In the present invention, data is written and read along a line on the surface of the tape media 902, parallel to the axis of a cylindrical pin 901. To accommodate changes in the focal plane due to either positional tolerance run-out along the scanned line, switching between tracks and/or dynamic changes in the tape thickness, the objective lens shown as contained in read/write head 903 is mounted on a piezoelectric element 904. The piezoelectric element 904 is driven by a servo system to maintain system focus. Such servo mechanisms for providing signals to adjust piezoelectric elements are well known in the art.

As discussed above, a second embodiment of the present invention may utilize transparent tape. In such an embodiment, the pin 901 is replaced with a transparent member allowing for transmission of the radiant energy from a source 903 to a receiving means as discussed previously.

DESCRIPTION OF A SECOND EMBODIMENT OF THE PRESENT INVENTION

FIG. 3(a) illustrates a second embodiment of the present invention having the photodiode 120 for reading information from the tape mounted separately in the tape recording system from the slider assembly 301 alleviating need for movement of the photodiode 120 during movement of the slider assembly over the tracks of the tape.

Such an embodiment may lead to reduced maintenance costs for the system by reducing wear of necessary wiring coupling photodiode 120 with circuitry of the present invention.

OVERVIEW OF THE COMPUTER CIRCUITRY OF THE PREFERRED EMBODIMENT

The preferred embodiments of the optical system of the present invention have been described above. The present invention is preferably implemented under computer control as shown in FIG. 5. The system of the preferred embodiment comprises a microprocessor 501 coupled with a buffer memory means, a scan generator 504, a tape drive 510, a track selector 511, an I/O interface 512, a tape sector encoding means 515 and a laser diode driver 517. The scan generator 504 is further coupled with an amplifier 505 which is, in turn, coupled with the scanner shown as block 506. The laser diode driver 517 is further coupled with the laser diode shown as block 518. The I/O interface 512 is further coupled to receive data input and to provide data output on line 513. Finally, the buffer memory means 502 is coupled with error correcting code circuitry 503 for providing error correcting codes to data stored in the buffer memory means 502.

In general, the system operates under control of the microprocessor 501. The microprocessor 501 may comprise any of several commercially available microprocessors or may be of a custom design. In the presently preferred embodiment, the an Intel 80286 microprocessor manufactured by Intel Corporation of Santa Clara, Calif. is utilized.

Data is input to the system over I/O line 513 through I/O interface 512 and loaded into buffer memory 502. The buffer memory 502 may, of course, be of varying capacity depending on cost and performance tradeoff considerations. In the presently preferred embodiment, the buffer memory 502 comprises 1 megabyte of random access memory (ROM). Data stored in the buffer memory 502 is provided with error correction/detection bits by error correction circuitry 503.

The data stored in buffer memory 502 is then provided to the laser diode 518 through laser diode drive circuits 517. The data thus provided to laser diode 518 is synchronized with scan generation signals providing by microprocessor 501.

Coincident with reading or writing of a scan line, the tape drive system moves the tape to permit adjacent scan lines to be written or read with appropriate line spacing, again under the control of microprocessor 501. The microprocessor 501 further controls tape head movement and other functions of the system.

When reading information from tape, signal detector 520 provides data to buffer memory 502, again under the control and synchronization of microprocessor 501. The data may then be sent over the I/O channel 513 over interface 512.

Thus, an apparatus and method for optically reading and writing information onto a recording medium is described.

What is claimed is:

1. In an optical tape recording system for recording digital information on an optical tape including a light source for producing a light beam and means, optically coupled with said light source, for focussing and directing said light beam at said optical tape, said optical tape including a plurality of tracks for recording said digital information, each of said plurality of tracks comprising at least one row of digital information, the improvement wherein at least one of said rows of digital information comprises positioning information for controlling positioning of said focussing and directing means in longitudinal and transversal directions.

2. The improvement as recited by claim 1 wherein said positioning information comprises a first plurality of bits for identifying a track number and a second plurality of bits for indicating a relative longitudinal position.

3. The improvement as recited by claim 2 wherein said optical tape recording system further comprises means for reading coarse position information encoded on said optical tape.

4. The improvement as recited by claim 1 wherein said positioning information further comprises control information for controlling focussing of said focussing and directing means in a tangential direction.

5. A digital information recording system for recording digital information on a tape, comprising:
   a read/write head for reading and writing said digital information;
   a first reel for holding a first portion of said tape;
   a second reel for holding a second portion of said tape;
   first drive means for driving said first reel and said second reel at a first speed;
   second drive means for causing movement of said tape relative to said read/write head at a second speed, said second speed slower than said first speed.

6. The recording system as recited by claim 5 wherein said tape is optical tape.

7. The recording system as recited by claim 5 further comprising:
   first tensioning means for tensioning said tape in a first direction relative to said first reel and said second drive means;
   second tensioning means for tensioning said tape in a second direction relative to said first reel and said second drive means.

* * * * *